United States Patent [19]
Oda

[11] Patent Number: 5,321,923
[45] Date of Patent: Jun. 21, 1994

[54] ANTIVIBRATION ACTUATOR

[75] Inventor: Koichi Oda, Ageo, Japan

[73] Assignee: Hitachi Metals, Ltd., Tokyo, Japan

[21] Appl. No.: 76,743

[22] Filed: Jun. 15, 1993

[30] Foreign Application Priority Data

Jun. 17, 1992 [JP] Japan .................. 4-041341[U]

[51] Int. Cl.⁵ .............................. E04B 1/98
[52] U.S. Cl. .............................. 52/167 DF
[58] Field of Search .................. 52/167 DF

[56] References Cited

U.S. PATENT DOCUMENTS 4,635,892  1/1987  Baker .............. 52/167 DF X
4,924,640  5/1990  Suizu et al. ............ 52/167 DF

FOREIGN PATENT DOCUMENTS 63-135629  6/1988  Japan .............. 52/167 DF
2-186072   7/1990  Japan .............. 52/167 DF
3-47379    2/1991  Japan .............. 52/167 DF Primary Examiner—Carl D. Friedman
Assistant Examiner—Kevin D. Wilkens
Attorney, Agent, or Firm—Sughrue, Mion, Zinn, Macpeak & Seas

[57] ABSTRACT

An antivibration actuator which alleviates vibration applied to a machinery or a building accommodating the machinery to protect the machinery and building from earthquake or other external perturbing vibration. A signal from a sensor disposed on a vibrated body can be inputted thereto through a control device and a waveform opposite to that of a vibration transmitted to the vibrated body is generated in order to reduce the vibration transmitted to the vibrated body. In particular, it is so constructed that it includes a coil member including a holding plate and flat coils disposed on a front and a rear surface of the holding plate and secured to a fixed member disposed independently from the vibrated body; a movable member including a pair yokes and a plurality of permanent magnets disposed on said yokes opposite to the flat coils through magnetic air gaps and magnetized in a thickness direction so that opposite poles appear alternately in a longitudinal direction. The movable member is movable in the longitudinal direction. Further, the movable member is joined with the vibrated body, and the flat coils generate a magnetic field in a direction opposite to that of the magnetic field generated by the permanent magnets by making a control current, based on the signal coming from the sensor, flow therethrough. In this way, a compact antivibration actuator having a simple construction, good response characteristics and high reliability can be obtained.

4 Claims, 3 Drawing Sheets

ANTIVIBRATION ACTUATOR

BACKGROUND OF THE INVENTION

The present invention relates to an antivibration actuator constituting an antivibration device, which alleviates vibration applied to an electronic computer, a precision machine, etc. or a building, etc., in which these devices are accommodated, to protect these apparatuses, building, etc. from earthquake or other external perturbing vibration, and in particular to an antivibration actuator, in which moving parts are composed of permanent magnets so that vibration transmitted to a vibrated body is reduced by a repulsing magnetic field between the magnets and fixed coils.

Heretofore antivibration springs, antivibration rubber, etc. have been used as antivibration devices for machineries, buildings, etc. Each of these antivibration devices is disposed between a moving side consisting of a machine device, a floor of a building, etc. and a fixed side consisting of a foundation of the building, etc. to transform external perturbing vibrations such as traffic vibrations, vibrations due to construction work, earthquake, vibrations due to wind, etc. into slow movements having long periods.

In some of such antivibration devices, e.g., ball bearings or rollers are incorporated in a bottom part of a construction to be protected, or rubber, air springs, etc. are used. However, in the former, since they have great friction coefficients, their vibration preventing action or antivibration action is not always satisfactory. On the other hand, in the latter, since they have certain characteristic frequencies determined by their weight and elastic modulus, it is not assured that they will produce no resonances with seismic waves.

Further, antivibration devices utilizing oil dampers, steel plate dampers, etc. have been proposed. However, the former which is an antivibration device utilizing an oil damper has a drawback in that not only daily maintenance for preventing occurrence of oil leak or other inconveniences is complicated but also the viscosity of the oil is varied by temperature variations, which makes its antivibration action unstable. On the other hand, although the latter which is an antivibration device utilizing a steel plate damper has an advantage in that maintenance is easy and at the same time it has no variations due to temperature variations, it has a drawback that it has hysteresis and thus it is lacking in linearity.

A ball screw type antivibrator with a magnetic attenuator has been proposed as a mechanical antivibration device capable of removing the drawbacks as described above (refer to NIPPON KIKAIGAKKAI ROMBUNSHUU (Reports of The Japan Society of Mechanical Engineers (Book C), Vol. 51, No. 471 (November 1985)). In this antivibration device, a disk made of a conductive material such as copper or aluminium is disposed at the extremity of the ball screw and when this disk is rotated in magnetic field, braking force due to eddy current produced in the flat plate is utilized. It was realized for studying theoretically and experimentally antivibration the effect when an antivibration device of the type consisting of a flywheel and a magnetic attenuator (mechanical snapper) and an antivibration device consisting only of a ball screw and a magnetic attenuator (mechanical dashpot) are mounted on separate simple supporting beams and for confirming experimentally temperature characteristics of an antivibration device.

Further a proposition has been disclosed, which is characterized in that a damper consisting of a magnetic and a conductor plate braked by magnetic force of the magnetic body is combined with an antivibration or vibration preventing device constructed by combining a rotating sphere and a cone- or arc-shaped concave receptor (JP - A - 63 - 223244).

An advantage that periodical inspection work is made unnecessary and stability of characteristics is assured can be obtained by using a damper, which is a combination of a conductor plate and a magnet, as described above. However, in the prior art antivibration device described above, since the intensity of the magnetic field, into which the conductive plate is inserted, is constant, a problematical point that the antivibration effect or the vibration preventing effect for a vibrated body is not always satisfactory coexists.

Therefore, recently, so-called active vibration controlling means, which cancel or reduce a pertinent vibration by vibration positively produced, studied. Owing to such means, an active antivibration effect can be expected more strongly than the conventional so-called passive antivibration effect.

FIG. 1 is a simplified block diagram showing an example of the active vibration controlling means for explaining the principle of the present invention. In FIG. 1, T represents transmission characteristics of an antivibration supporting system; A represents transmission characteristics including an actuator system for generating controlling vibration (compensated system) and H represents transmission characteristics of a compensating system, which should be realized by means of a digital filter, H being set so as to satisfy $H = -T/A$. That is, in the present active vibration controlling means, transmitted vibration is canceled by the fact that a vibration having a waveform opposite to the waveform of the vibration propagating through the antivibration supporting system is generated by making vibration coming from a base plate pass through the digital filter satisfying the formula described above.

FIG. 2 is a block diagram indicating an example of the active vibration controlling means for explaining the principle of the present invention, in which the simplified block diagram indicated in FIG. 1 is concertized. In FIG. 2, reference numeral 31 is a base plate, which is put on the surface of a floor 32 through a rubber plate 33; 34 is a table, which is disposed on an antivibration supporting device 35 standing on the base plate 31; 36 is a horizontal vibrator disposed on the base plate 31; and 37 is an actuator disposed on the table 34.

Next 38 represents digital filter means consisting of an A/D converter 39, a digital filter 40 and a D/A converter 41. The digital filter means 38 is so constructed that a signal coming from a sensor 42 disposed on the base plate 31 is inputted thereto through a charge amplifier 43 and a low pass filter 44 and outputted to the actuator 37 through a low pass filter 45 and a power amplifier 46. Further, 47 represents a monitor sensor disposed on the table 34, which outputs a signal to an FET device 49 through a charge amplifier 48. On the other hand, the signal from the sensor 42 described above is inputted through the charge amplifier 43 to the FET device 49, which outputs a signal processed therein to the digital filter means 38 described above.

In the construction indicated in FIG. 2 described above, in a state where the horizontal vibrator 36 is operated, the transmission function T of the antivibration supporting system is measured between the output sides of the charge amplifiers 43 and 48, i.e., a and b in the figure, respectively. Next, a noise signal is inputted through a point a and the transmission function A of the compensating system is measured. The transmission function H is calculated by using these two transmission functions T and A and the formula $H = -T/A$ to obtain an impulse response, which is written-in as a coefficient for the digital filter 40 (FIR filter).

It is confirmed that a great vibration reducing effect can be obtained, as a result of generating vibration in a horizontal direction in the table 34 by means of the horizontal vibrator 36 in the device described above and applying vibration having a waveform opposite to the waveform of the vibration transmitted to the vibrated body to the actuator 37 through the digital filter means 38 (Conference Reports of NIPPON ONKYO GAKKAI (The Acoustical Society of Japan), published March 1989).

For the active vibration controlling means as described above, it is important to generate surely a vibration having a waveform opposite to the waveform of the vibration applied to the table 34 by means of the actuator 37. Various types are known for such an actuator 37, but no actuators, which are satisfactory from the point of view of construction, weight, practicability, etc., are known for the antivibration, as indicated in FIG. 2.

SUMMARY OF THE INVENTION

A main object of the present invention is to provide a compact antivibration actuator capable of solving the problems of the prior art techniques described above, having a simple construction, good response characteristics and a high reliability.

Another object of the present invention is to provide an antivibration actuator, in which a moving part and a coil members are constructed so as not to be in contact with each other so that mechanical loss in the antivibration energy is almost negligibly small.

Still another object of the present invention is to provide an antivibration actuator having a high efficiency in the antivibration action.

In order to achieve the above objects, according to the present invention, technical means is adopted to construct an antivibration actuator, by which a signal from a sensor disposed on a vibrated body can be inputted thereto through a control device and a waveform opposite to that of a vibration transmitted to the vibrated body is generated in order to reduce the vibration transmitted to the vibrated body, wherein it comprises a coil member including a holding plate and flat coils disposed on a front and a rear surface of the holding plate and secured to a fixed member disposed independently from the vibrated body; a movable member comprising a pair of yokes and a plurality of permanent magnets magnetized in a thickness direction and disposed on said yokes so that opposite poles appear alternately in a longitudinal direction. The movable member is movable in the longitudinal direction and is joined with the vibrated body; said flat coils generating a magnetic field in a direction opposite to that of the magnetic field generated by said permanent magnets by making a control current, based on the signal coming from the sensor, flow therethrough.

Further, it is preferable to use permanent magnets of a rare earth system having a great maximum magnetic energy product, above all permanent magnets of a R—Fe(Iron)—B(Boron) system (R representing at least one rare earth element such as Nd and Pr) for the permanent magnets for realizing the present invention.

Owing to the construction described above, it is possible to reduce remarkably undesired vibration acting on the vibrated body. Further, since the coil member and the movable part are never brought into contact with each other, mechanical loss in the antivibration energy can be almost neglected, the efficiency of the antivibration action is high, and response characteristics and reliability can be significantly improved.

BRIEF DESCRIPTION OF THE DRAWINGS

Preferred embodiments of the present invention will be described in conjunction with the accompanying drawings, in which.

DESCRIPTION OF THE PREFERRED EMBODIMENTS

Figure 3:
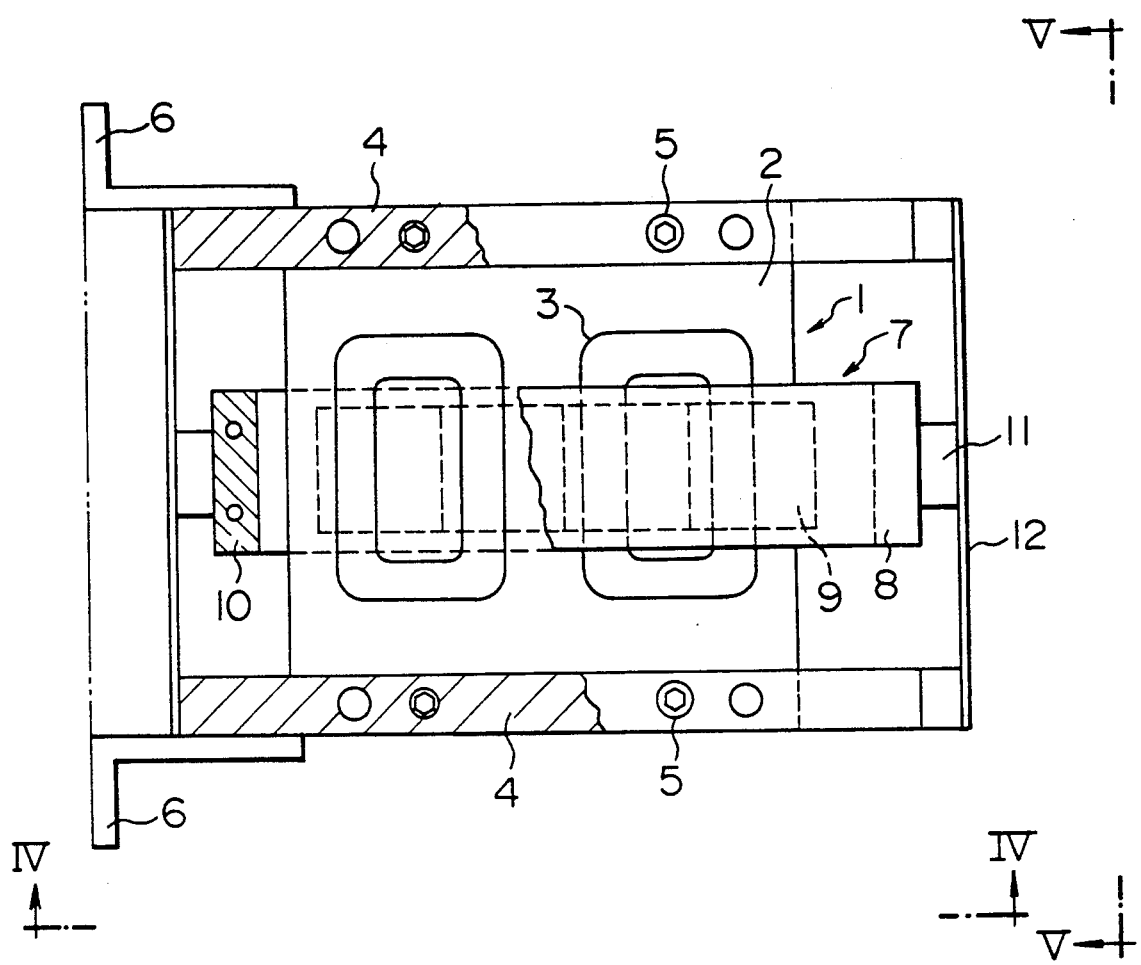
FIG. 3 is a front view of a principal part of an embodiment of the antivibration actuator according to the present invention, indicated partially in a cross-sectional view.
Figure 4:
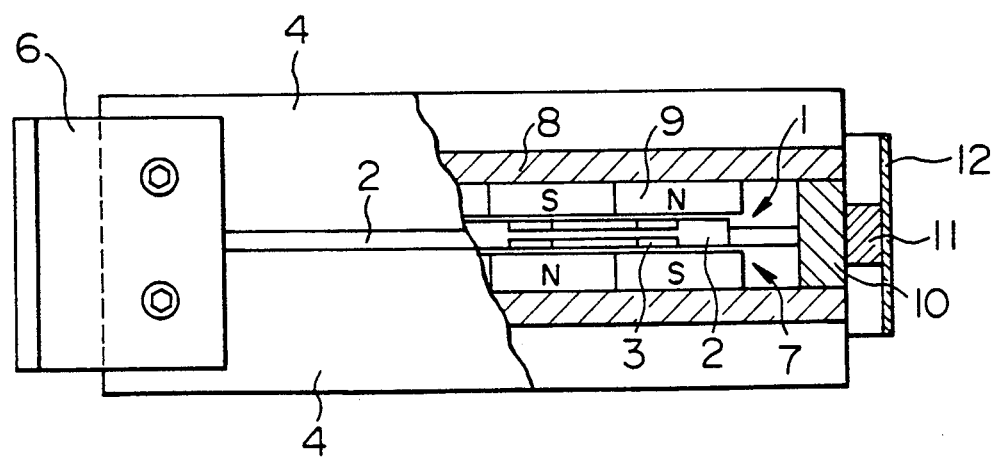
FIG. 4 is a plan view of the principal part of the embodiment viewed in the direction indicated by IV—IV in FIG. 3, indicated partially in a cross-sectional view.
Figure 5:
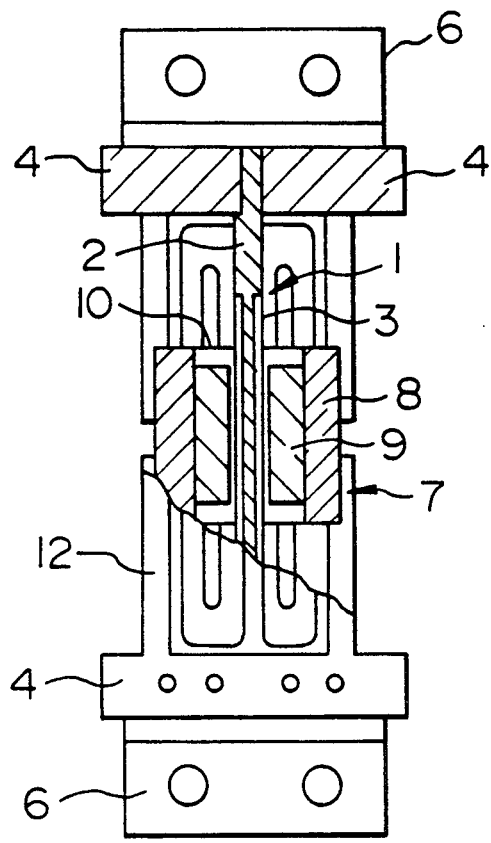
FIG. 5 is a right side view of the principal part of the embodiment viewed in the direction indicated by V—V in FIG. 3, indicated partially in a cross-sectional view.

FIGS. 3 to 5 are a front view, a plan view and a right side view, respectively, of a principal part of an embodiment of the antivibration actuator according to the present invention, indicated partially in cross-sectional views. In FIGS. 3 to 5, reference numeral 1 is a coil member formed by fixing flat coils buried in the front and rear surface portions of a holding plate 2 made of steel such as, e.g., SS400. The reference numeral 4 represents side plates, each of which is formed in a flat plate made of a non-magnetic metal material such as, e.g., A5052, which is secured by means of screws 5 at the upper and the lower portion thereof, putting the coil member 1 therebetween. Supporting members 6 are made of a material similar to that of the side plates 4 and are formed approximately in an L-shape and are secured to one of the end portions in the longitudinal direction of the side plates 4.

Next 7 is a movable part consisting of yokes 8 made of a soft magnetic material such as, e.g., SS400 and formed in a band shape, permanent magnets 9 secured to the surface of these yokes, and connecting members 10 holding the intervals between the permanent magnets 9, 9 disposed at the end portions of the yokes 8, 8. The permanent magnets 9 are made of, e.g., magnets of an Nd—Fe—B system (HS35BH fabricated by Hitachi Metals Ltd.) magnetized in the thickness direction and disposed so that different poles are opposite to each other and that the different poles appear alternately in the longitudinal direction of the yokes 8. It is preferable that magnetic air gaps formed between the flat coils 3 and the permanent magnets 9 are as small as possible.

The movable member 7 constructed as described above is supported between the side plates 4, 4 through spacers 11 and springs 12 formed as described later disposed at the two end portions in the longitudinal direction so as to be movable forward and backward in the longitudinal direction. The spacers 11 are made of a non-magnetic material such as, e.g. A5052 and the springs 12 are made of, e.g., phosphor bronze.

Figure 6:
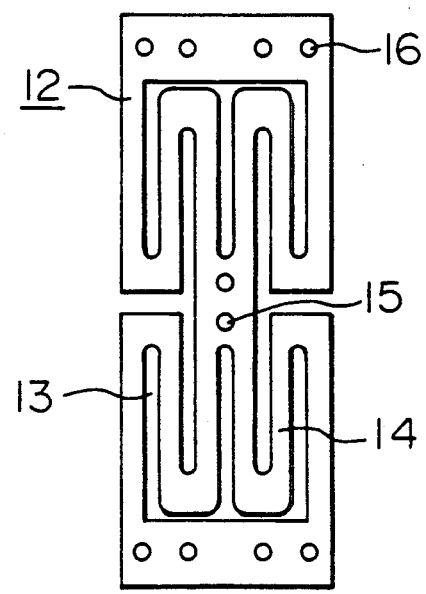
FIG. 6 is a side view of a spring 12 indicated in FIGS. 3 to 5.

FIG. 6 is a side view indicating one of the springs 12 in FIGS. 3 to 5. In FIG. 6, the spring 12 is so constructed that continued S-shaped parts 14 are made by forming sidelong thrown down E-shaped and L-shaped grooves 13 in a rectangular plate made of, e.g., phosphor bronze. Reference numerals 15 and 16 denote holes for mounting, which are dimensioned so that bolts (not indicated in the figures) for mounting it on the spacer 11 and the side plate 4 in FIGS. 3 to 5 can pass therethrough.

Figure 1:
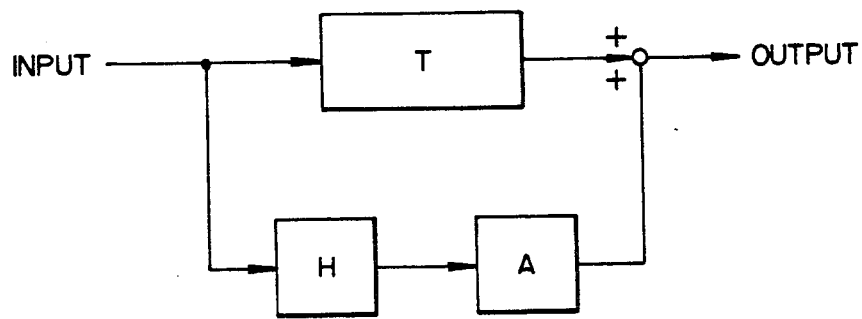
FIG. 1 is a simplified block diagram showing an example of active vibration controlling means for explaining the principle of the present invention.
Figure 2:
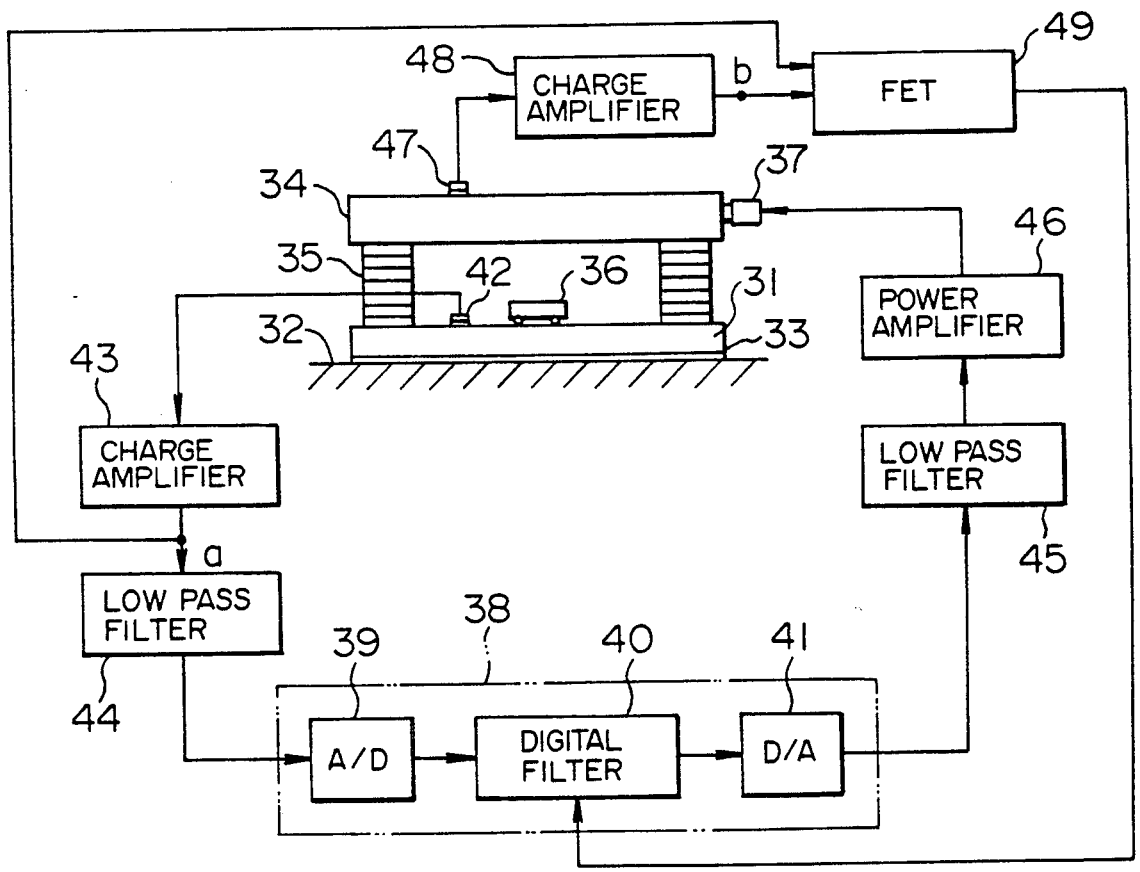
FIG. 2 is a block diagram showing an example of the active vibration controlling means for explaining the principle of the present invention.

The construction described above is secured to a fixed member (not indicated in the figures) disposed independently from a vibrated body (not indicated in the figures, corresponding to the table 34 in FIG. 2) and one of the end portions of the movable member 7 is connected with the vibrated body (not indicated in the figures) in one body. When control current, e.g., coming from the digital filter means 38 as indicated in FIG. 2 is made flow through the flat coils 3 constituting the coil member 1, since they generate magnetic field in a direction opposite to that of the permanent magnets 9, they can reduce vibration of the vibrated body (e.g., the table 34 indicated in FIG. 2).

In this case, since the movable member 7 is supported by the springs 12 constructed as indicated in FIG. 6 at its end portions, it can move smoothly in the horizontal direction and at the same time also for the up and downward movement of the vibrated body, since S-shaped parts 14 are formed continuously, it can follow vibration of the vibrated body with a high fidelity. Consequently the vibration transmission efficiency from the vibrated body to the movable part 7 is very high and vibration energy loss and antivibration energy loss due to the springs 12 are almost negligibly small.

Although, in the embodiment of the present invention, an example is shown, in which four permanent magnets are opposed to every two flat coils, suitable numbers can be selected therefore, taking inertia of the vibrated body, etc. into account. Further, two sets of antivibration devices may be used for antivibration of, e.g., an XY table by disposing orthogonally the movement directions of two movable members. Further, one set of antivibration device may be added thereto, in which the movement direction of the movable member is in the vertical direction.

Since the antivibration device according to the present invention is constructed and works as described above, the construction thereof is simple and compact. At the same time, since the movable part is never brought into contact with the coil member, excellent effects in that the mechanical loss in the antivibration energy is almost negligibly small, the efficiency of the antivibration action is high, and the response characteristics and reliability can be remarkably improved, can be obtained.

I claim:

1. An antivibration actuator, by which a signal from a sensor disposed on a vibrated body is inputted thereto through a control device and a waveform opposite to that of a vibration transmitted to a vibrated body is generated in order to reduce the vibration transmitted to the vibrated body, comprising:

a coil member including a holding plate, which includes a front surface and a rear surface, and a plurality of flat coils disposed on said front surface and said rear surface, said coil member being secured to a fixed member disposed independently from the vibrated body; and a movable member comprising a pair of spaced apart yokes defining opposing inner walls, and a plurality of permanent magnets magnetized in a thickness direction thereof and disposed on said opposing inner walls so that opposite poles are arranged alternately in a longitudinal direction of said pair of yokes, said holding plate of said coil member extending between said pair of spaced apart yokes, said movable member being movable in the longitudinal direction, wherein said movable member is connected with the vibrated body, and said flat coils generate a magnetic field in a direction opposite to that of a magnetic field generated by said permanent magnets by making a control current, based on the signal coming from the sensor, flow therethrough.

2. An antivibration actuator according to claim 1, wherein permanent magnets of an R—Fe—B system are used for permanent magnets, wherein:

R represents at least one rare earth element;
   Fe represents Iron; and
   B represents Boron.

3. An antivibration actuator according to claim 1, further comprising a pair of spaced apart side plates fixedly mounted to the fixed member, said holding plate of said coil member extending between and being secured to said side plates.

4. An antivibration actuator according to claim 3, further comprising plate-like springs mounted at opposite ends of said side plates and extending across the spaced apart side plates, said movable member being supported at opposite ends by said plate-like springs.

* * * * *